G. T. THOMPSON.
WAFFLE CUTTER.
APPLICATION FILED MAR. 6, 1912.
1,053,755.
Patented Feb. 18, 1913.
2 SHEETS—SHEET 1.
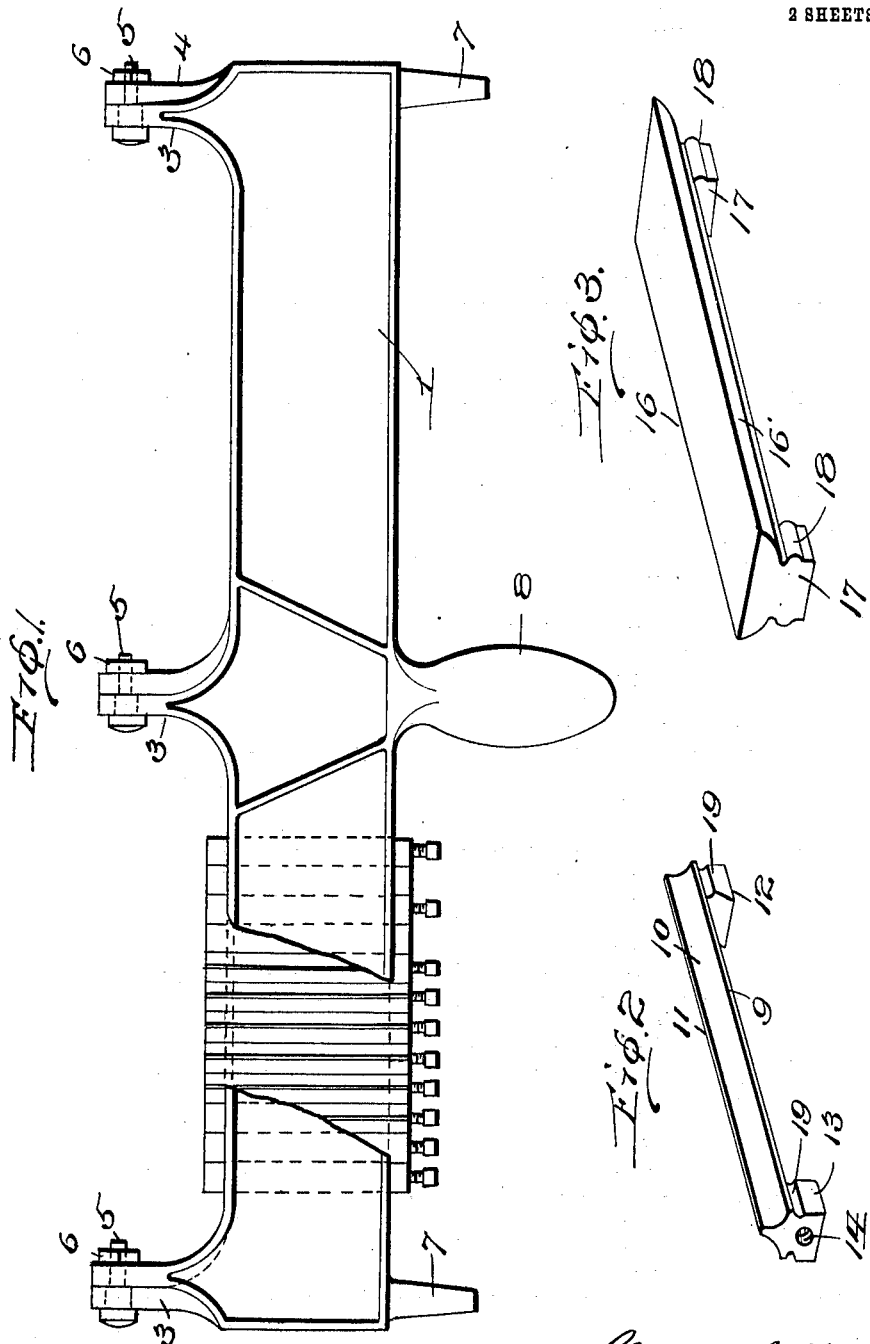

G. T. THOMPSON.
WAFFLE CUTTER.
APPLICATION FILED MAR. 6, 1912.
1,053,755.
Patented Feb. 18, 1913.
2 SHEETS—SHEET 2.
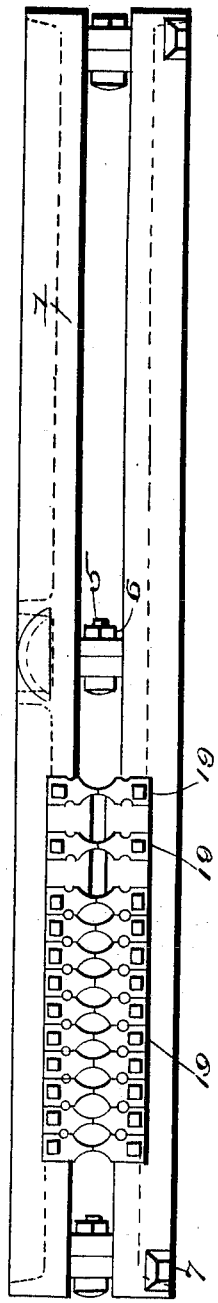
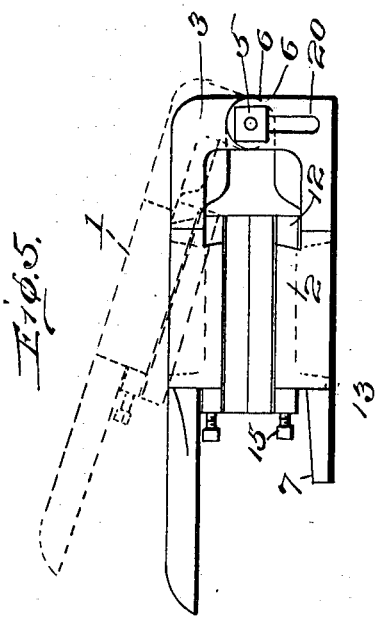

UNITED STATES PATENT OFFICE.

GLENN T. THOMPSON, OF SANTA BARBARA, CALIFORNIA.

WAFFLE-CUTTER.

1,053,755.

Specification of Letters Patent. Patented Feb. 18, 1913.

Application filed March 6, 1912. Serial No. 682,033.

*To all whom it may concern:*

Be it known that I, GLENN T. THOMPSON, a citizen of the United States, residing at Santa Barbara, in the county of Santa Barbara and State of California, have invented certain new and useful Improvements in Waffle-Cutters, of which the following is a specification.

This invention relates to devices for cutting candy, waffles, and other substances.

The invention has for its object to provide an improved device of this kind by means of which, candy, waffles, and other substances may be efficiently and suitably cut into shapes.

The invention further has for its object to provide an improved cutting device of this kind, so constructed and arranged that it may be adjusted to cut candy, waffles, and other substances into different forms and shapes.

The invention further has for its object to provide an improved cutting device of this kind so constructed and arranged that the operating parts thereof may be employed or a part or all of the detachable cutters may be used with the device.

Referring to the accompanying drawings, Figure 1 is a plan view of a cutting device constructed in accordance with this invention, partly broken away and having a portion of the cutters mounted on the device, the others being omitted. Fig. 2 is an enlarged detailed view in perspective of one of the cutters detached. Fig. 3 is a detailed view in perspective of one of the filling plates which are used between the cutters. Fig. 4 is a front view of the cutting device. Fig. 5 is an end view having the means for adjusting the upper plate in spaced relation to the lower plate.

In carrying out the invention, a pair of oblong plates 1 and 2 are provided, which carry the cutters, said plates being hinged together at their rear edges by means of depending arms 3 on the upper plate 1 hinged to the vertical arms 4 on the lower plate 2 by means of pins 5 held in place by a nose 6. The hinge construction just described locates the upper plate in spaced relation to the lower plate, so as to provide room for the meeting edges of the cutters on the upper and lower plates. The lower plate is provided at its forward edge and at its ends with the projection 7. The upper plate 1 is operated to bring the cutters on the upper plate into cutting relation with the cutters on the lower plate by means of a suitable handle 8.

In Fig. 2 is shown one of the cutters 9, a number of such cutters being employed and mounted on the upper and lower plates, each of said cutters is formed longitudinally with the vertically curved sides 10 terminating in the longitudinal cutting edge 11, the cutter being slidably mounted on the plate in any suitable manner, and as here shown, preferably by means of depending engaging lugs 12 and 13 overlapping the rear and front edges of the plate, and are secured in adjustable position thereof, by suitable means, as for example, by threaded hole 14 in the lug 13, which is provided with a clamping screw 15, adapted to engage the edge of the plate.

In order to provide suitable spaces or cavities in which the material to be cut is molded and separated in sections, a number of the filling plates 16 are employed, one of said plates being shown in Fig. 3, and consisting of an oblong plate of suitable metal provided at its ends with depending lugs 17, which as shown in Fig. 4 are adapted to engage the grooves 19 in the lugs 12 and 13 of the cutters 9. It will be seen in Fig. 4 that between each pair of upper and lower cutters a pair of plates 16 spaced apart from each other will form a space for the reception of the material to be cut and molded, the lug 6 of the plate 16 being formed with a curve 16′ so as to fit into the adjacent curve 10 of the adjacent cutter 9.

With the arrangement of the cutters and filling plates as shown in Fig. 4, the material or substance to be cut and molded will be formed of a certain shape corresponding to the space and shape of the adjacent parts of the cutters and upper and lower filling plates.

The substance to be cut may be formed in various shapes by removing the filling plates or by removing the cutters on one of the plates and, in order that the plates 1 and 2 may maintain the proper spaced relation to each other when the cutters on one of the plates are removed, suitable adjusting means have been provided in connection with the hinges, which is shown in Fig. 5, preferably consist of a slot 20 in each of the arms 4 through which the pin 5 projects. In order to adjust the space between the plates 1 and 2 by loosening the nuts 6, the plate 1 may be lowered to the proper adjusted position relative to the plate 2, and the nuts 6 then tightened up to hold the plate when in such adjusted position.

Having described my invention, I claim—

In a cutting device of the kind described, a pair of oblong metallic plates, one of which is fixed and is formed at its rear edge with vertical bracket arms, each provided with a vertical slot, and the other plate adapted to be moved toward and away from the fixed plate and formed at its rear edge with depending bracket arms overlapping the vertical bracket arms on the lower plate, a hinged pin projecting through said slot in the lower bracket arm and the overlapping bracket arm of the upper plate and a binding nut on one end of said hinge pin.

In testimony whereof I affix my signature in presence of two witnesses.

GLENN T. THOMPSON.

Witnesses:
 EUNICE MCCOMBS,
 ELSIE MORRISON.

Copies of this patent may be obtained for five cents each, by addressing the "Commissioner of Patents, Washington, D. C."